(12) United States Patent
Lavie et al.

(10) Patent No.: US 11,812,889 B2
(45) Date of Patent: Nov. 14, 2023

(54) BEVERAGE DISPLAYING AN EDIBLE PRINTED DESIGN IMAGE THEREUPON, AND A METHOD FOR PRODUCTION THEREOF

(71) Applicant: Ripples Ltd., Petah Tikva (IL)

(72) Inventors: Danny Lavie, Ramat Hasharon (IL); Eyal Eliav, Tel Aviv (IL)

(73) Assignee: RIPPLES LTD, Petah Tikva (IL)

( * ) Notice: Subject to any disclaimer, the term of this patent is extended or adjusted under 35 U.S.C. 154(b) by 472 days.

(21) Appl. No.: 17/079,477

(22) Filed: Oct. 25, 2020

(65) Prior Publication Data

US 2021/0106164 A1 Apr. 15, 2021

Related U.S. Application Data

(63) Continuation of application No. 12/583,770, filed on Aug. 26, 2009, now Pat. No. 10,813,488.

(51) Int. Cl.
*A23L 5/42* (2016.01)
*A47J 31/44* (2006.01)
(Continued)

(52) U.S. Cl.
CPC ............... *A47J 31/44* (2013.01); *A23F 5/243* (2013.01); *A23F 5/465* (2013.01); *A23L 2/54* (2013.01);
(Continued)

(58) Field of Classification Search
None
See application file for complete search history.

(56) References Cited

U.S. PATENT DOCUMENTS 4,366,173 A 12/1982 Parker
4,496,605 A 1/1985 Targan
(Continued)

FOREIGN PATENT DOCUMENTS

CN 101072682 A 11/2007
CN 103957729 A 7/2014
(Continued)

OTHER PUBLICATIONS

Harper, "Beer Ripples can 3D print a picture on your next pint". Available online as of Mar. 16, 2018, from https://www.techlicious.com/blog/beer-ripplesbeer-art/. pp. 1-3. (Year: 2018).*
(Continued)

*Primary Examiner* — Jenna A Watts
(74) *Attorney, Agent, or Firm* — Momentum IP; Marc Van Dyke (57) ABSTRACT

The present invention discloses a beverage displaying a printed design image upon a foamed portion of the beverage. The invention further discloses a device and method for same. In the invention, an automated printer is used, comprising a movable printing head, loaded with an edible liquid ink, to print a design of interest upon the beverage foam. In some embodiments, the beverage is coffee and the liquid ink is a second coffee essence. The invention additionally discloses business methods comprising printing an advertisement upon a foamed portion of a beverage, or selling a beverage displaying a printed image upon a foamed portion of the beverage.

18 Claims, 4 Drawing Sheets

(51) Int. Cl.
*A23F 5/24* (2006.01)
*A23F 5/46* (2006.01)
*A23L 2/54* (2006.01)
*A23L 2/58* (2006.01)
*A23P 20/25* (2016.01)

(52) U.S. Cl.
CPC ............ *A23L 2/58* (2013.01); *A23L 5/42* (2016.08); *A23P 2020/253* (2016.08)

(56) References Cited

U.S. PATENT DOCUMENTS

| | | | |
|---|---|---|---|
| 7,884,953 | B1 | 2/2011 | Willcocks et al. |
| 2006/0286218 | A1* | 12/2006 | Salzman .............. A23L 23/00 426/106 |
| 2009/0317519 | A1 | 12/2009 | Lavie et al. |
| 2015/0147444 | A1 | 5/2015 | Eliav et al. |
| 2015/0251470 | A1 | 9/2015 | Lavie et al. |
| 2016/0021907 | A1 | 1/2016 | Cavin et al. |
| 2017/0066252 | A1 | 3/2017 | Eliav et al. |
| 2021/0106164 | A1 | 4/2021 | Lavie et al. |

FOREIGN PATENT DOCUMENTS

| | | | |
|---|---|---|---|
| CN | 105209560 | A | 12/2015 |
| CN | 205381003 | U | 7/2016 |
| CN | 107075287 | A | 8/2017 |
| EP | 0372243 | A1 | 6/1990 |
| IL | 178519 | A | 4/2016 |
| JP | 2759215 | B2 | 7/2016 |
| JP | 2016119894 | A | 7/2016 |
| JP | 2016119895 | A | 7/2016 |
| JP | 2017110178 | A | 6/2017 |
| KR | 20030093471 | A | 12/2003 |
| KR | 100485145 | B1 | 7/2016 |
| WO | 0194116 | A2 | 12/2001 |
| WO | 2005069729 | A2 | 8/2005 |
| WO | 2007013061 | A2 | 2/2007 |
| WO | 2008047347 | A2 | 4/2008 |
| WO | 2014139966 | A1 | 9/2014 |
| WO | 2017221077 | A2 | 12/2017 |

OTHER PUBLICATIONS

JP2017110178A5 Machine Translation (by Google Translate)—published Jul. 11, 2019.
KR20030093471A Machine Translation (by Google Translate)—published Apr. 25, 2005.
Weyermann: "Original Superb Bavarian and Bohemian Two-Row Malts", Weyermann Malt, Sep. 30, 2017 (Sep. 30, 2017).
International Search Report for PCT/IB2018/058224 dated Mar. 24, 2019.
Written Opinion for PCT/IB2018/058224 dated Mar. 24, 2019.
Product Specification of Weyermann® Roasted Malt Extract (RME) [Sep. 29, 2018], retrieved from Weyermann website on Nov. 15, 2021.
Machine Translation (by Google Patents) for CN101072682 published on Nov. 14, 2007.
Machine Translation (by Google Patents) for CN103957729 published on Jul. 30, 2014.
Machine Translation (by Google Patents) for CN105209560 published on Dec. 30, 2015.
Machine Translation (by Google Patents) for CN107075287 published on Aug. 18, 2017.
Machine Translation (by Google Patents) for CN205381003 published on Jul. 13, 2016.
Machine Translation (by EPO and Google) for EP0372243 published on Jun. 13, 1990.
Machine Translation (by Google Patents) for JP2016119894 published on Jul. 7, 2016.
Machine Translation (by Google Patents) for JP2016119895 published on Jul. 7, 2016.
Machine Translation (by Google Patents) for JP2759215 published on Jul. 7, 2016.
Machine Translation (by Google Patents) for KR100485145 published on Jul. 7, 2016.
Machine Translation (by EPO and Google) for IL178519 published on Apr. 21, 2016.
Co-pending U.S. Appl. No. 17/079,477, filed Oct. 25, 2020.
Co-pending U.S. Appl. No. 17/039,824, filed Sep. 30, 2020.
Co-pending U.S. Appl. No. 17/039,828, filed Sep. 30, 2020.
Co-pending U.S. Appl. No. 16/311,881, filed Dec. 20, 2018.

* cited by examiner

BEVERAGE DISPLAYING AN EDIBLE PRINTED DESIGN IMAGE THEREUPON, AND A METHOD FOR PRODUCTION THEREOF

CROSS-REFERENCE TO RELATED APPLICATIONS

The following patent applications are incorporated herein by reference: (i) U.S. patent application Ser. No. 12/583,770, filed on Aug. 26, 2009 which published as U.S. 2009/0317519 and which matured into granted U.S. Pat. No. 10,813,488; (iii) international application PCT/IL2005/000067, filed on Jan. 20, 2005, and published as WO 2005/069729 A2 and (iv) Israeli Patent No. 159990, filed on 21 Jan. 2004; the entirety of which is incorporated herein by reference.

FIELD OF THE INVENTION

The present invention generally relates to automated printing upon food items using edible ink. More specifically, the invention relates to printing upon the foamed portion of beverages.

BACKGROUND OF THE INVENTION

Automated printers and edible inks have been developed for printing upon the surface of cakes or upon semi-solid dairy products such as soft cheeses. Typically, artistic images are produced upon cakes, while the manufacturing or freshness date is printed upon dairy products. In mass-production of such foods, a printer is included upon a conveyor-belt type factory line, so that food items are advanced beneath the printer as one of the final steps prior to packaging.

Such printers and printing systems are not suited to printing upon beverages, as excessive movement of the beverage upon a conveyor-belt would result in distortion and destruction of the image.

Latte art has become popular in coffee shops, where a design is formed upon the foamed-milk portion of a cappuccino or other coffee drink. Typically, the design is created by hand, by pouring the foamed milk upon the brewed coffee, in an artistic manner, then using an applicator to form swirls or other designs of interest.

It is desirable to have an automated means of printing a printed design of interest upon a foamed portion of a beverage. Such automated printers would allow minute details to be easily printed upon a beverage, resulting in an image of photographic quality, and would allow mass-production of such images in a timely, reproducible manner. In addition to personalized beverages created for entertainment purposes, the printed images are useful for advertising purposes to promote sales or popularity of a specific logo printed upon the beverage.

SUMMARY OF THE INVENTION

There is thus provided a method for applying printed design images onto a foamed portion of the surface of a beverage. The method comprises providing an edible liquid ink, providing a beverage having a foamed portion; and printing an image of interest, on the foamed portion of the beverage. The printing is performed using an automated printer comprising a movable printing head, which is loaded with edible liquid ink. The beverage remains stationary during the printing step.

In the method, the printing device utilized may include a printing application head adapted to apply design images by moving the printing application head in a pattern correlated to the image content. The device may further include a digital controller adapted to receive an image specific signal and to issue control signals to the printing application head, such that the printing application head is actuated to apply the image onto the surface of the beverage. According to some further embodiments of the present invention, the device may include a printing application head which is adapted to apply drops of an edible liquid ink onto the foamed portion of the beverage.

In certain embodiments, the colorant in the edible liquid ink comprises a beverage essence, which may be a concentrated form of the beverage upon which the design is to be printed. In an example of such case, coffee essence may be loaded in the automated printer and used to print upon the foam of a mug of cappuccino (or upon the foam portion of another beverage).

The present invention additionally provides a beverage comprising a foamed portion, said foamed portion displaying a design image printed using edible liquid ink.

The present invention additionally provides a method of doing business, comprising selling the beverage of the invention (the beverage comprising the design image, printed upon the foamed portion of the beverage). Optionally, in the method of doing business, the image displayed is advertising material, paid for by an advertiser.

The terms 'froth' and 'foam' in reference to a 'frothed or foamed' portion of a beverage, are used interchangeably in the present invention, and refer to a mass of gas or air bubbles in an ingestible liquid-film matrix. The foam or froth may be formed by agitating a beverage at high speed, such as is typical in a milk-based drink such as cappuccino. Alternatively, the foam may be inherent to the beverage such as in a carbonated beverage or a bubbly alcoholic beverage, where a foam layer is typically formed over the beverage during decanting of the beverage.

The term 'first beverage' refers to a beverage upon which a design is to be printed, while the term 'second beverage' refers to an edible liquid ink which is loaded into a printer. In a non-limiting example, the first beverage may be a cappuccino contained in a mug, while the second beverage is a concentrated coffee essence used as a coffee ink.

The term 'edible liquid ink' used in the invention refers to an ink formulation which is edible in its entirety, and is used in liquid form in an automated printer.

The term 'automated printer' is used in the invention to refer to any type of electrical or battery-operated printer system. Non-limiting examples of automated printers suited for the invention, include inkjet printers, such as drop-on-demand and continuous ink-jet printers.

The terms 'content' and 'design' or 'design image' are used interchangeably in the present invention to refer to an image printed upon a beverage or foamed portion of a beverage, using an edible ink.

BRIEF DESCRIPTION OF THE INVENTION

FIG. 4A illustrates various designs of interest which may be selected from.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art since the generic principles of the present invention have been defined specifically to provide an automated printer useful for designing the surface of a first foodstuff or beverages containing a foam portion, a method printing the same and a method for advertising said design.

Figure 1:
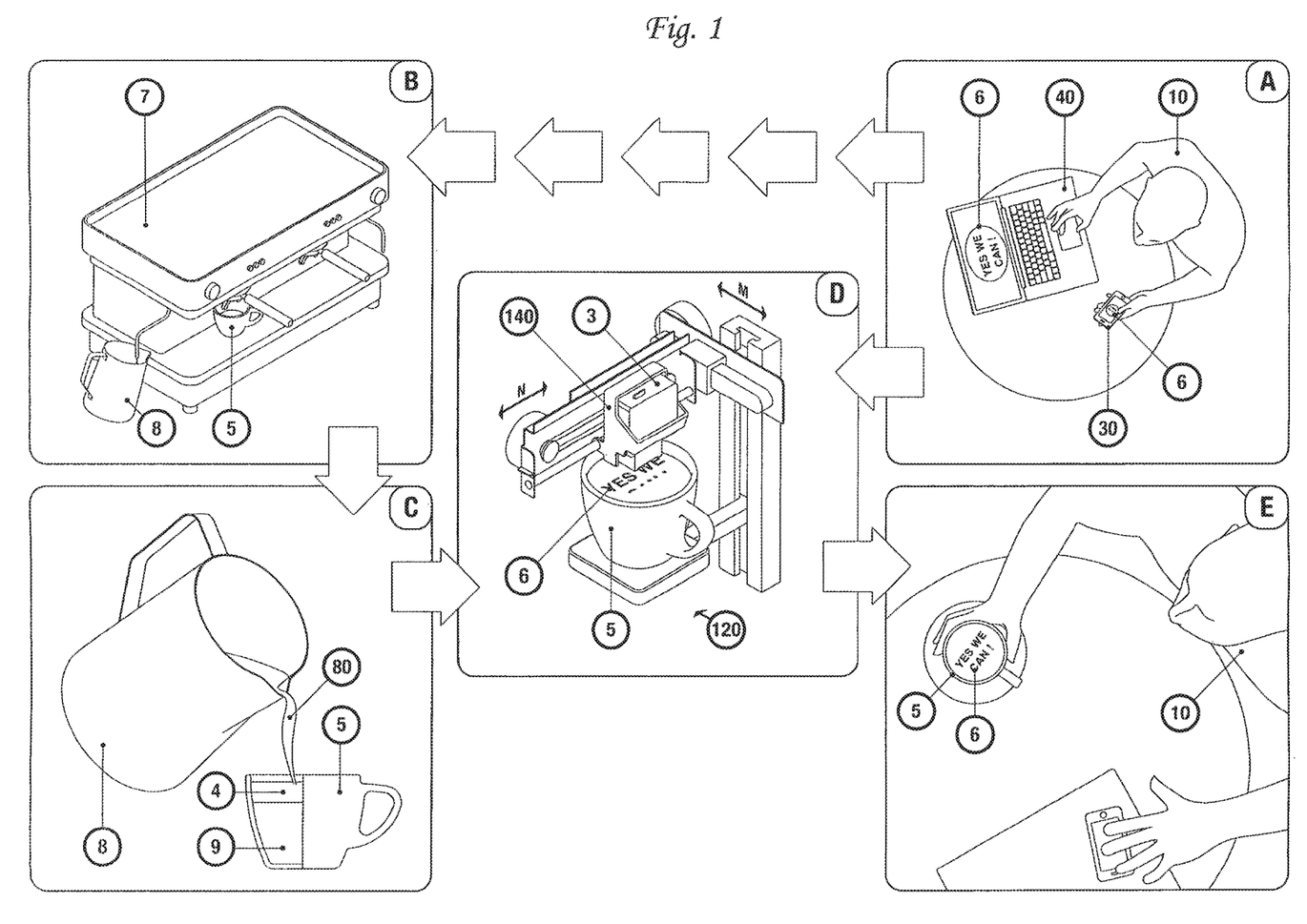
FIG. 1 illustrates an overview of the process of applying design image to the foamed portion of coffee according to one embodiment of the present invention.

Reference is made now to FIG. 1, illustrating an overview of the process of making a designed coffee image according to one embodiment of the present invention.

In Box A, a user 1 in a coffee shop has selected a design image 6, which he is interested in having printed upon his coffee beverage. The design image 6 of interest in this case, is the phrase "yes, we can". The user 1 has chosen to send a Wireless Text Message with a digital attachment encrypting for the phrase "yes we can", from his cellular phone 30, to an email account accessible on a computer terminal 40 controlling the printer of the invention.

Alternatively, user I may select the design of interest 6 by scrolling through a menu presented upon the screen of the computer terminal 40, without use of the cellular phone.

Referring to FIG. 1, Box B, a mug of milk-frothed coffee beverage (e.g. latte) 5 is simultaneously prepared for the customer, using an espresso machine 7, with foamed milk steamed and frothed in a pitcher 8.

Referring to Box C, foamed milk 80 is poured from pitcher 8 to latte 5 mug, to form a portion of foamed froth 4, layered over the coffee layer 9.

Referring to Box D, the layered latte is now introduced into the automated printer 120 of the invention. Automated printer 120 holds an ink cartridge 3 loaded with edible liquid ink. The printer 120 has a moveable printer head 140, which can move laterally or longitudinally, as shown by arrows (M, N). The computer terminal 40 controlling the printer 120 instructs the printer to print the design of interest 6, upon the foamed portion 4 of the coffee (flow of instructions from computer terminal 40 to printer 120 is indicated by arrow at upper right-hand corner of Box D). The mug of latte 5 remains stationary during the printing stage, with the printer head 140 performing any movement necessary to achieve the image design of interest 6. In Box D, design of interest 6 is partially printed, Referring to Box E, user I receives the final mug of latte 5 including the printed design of interest 6 printed upon the foamed froth 4 portion of the latte. As the design of interest 6 is printed in edible ink, the latte may be consumed by the user 1.

Figure 2:
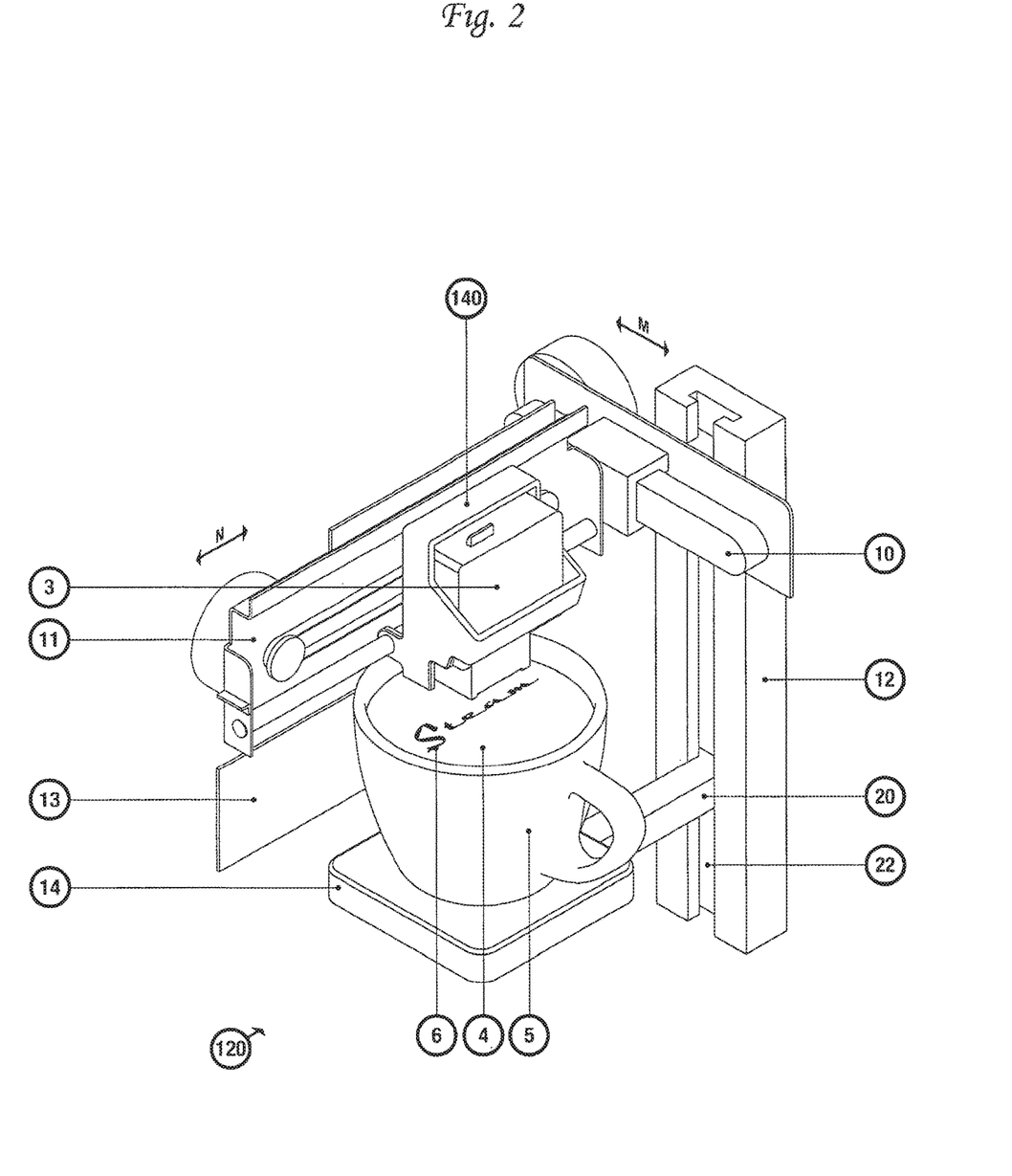
FIG. 2 is a perspective view of an inkjet drop-on-demand printer according to one embodiment of the invention.

Referring to FIG. 2, a perspective view of one embodiment of the printer of the invention is shown. Automated printer 120 is an inkjet printer, comprising a printer head 140 incorporating an ink cartridge 3 loaded with an edible liquid ink. Printer 120 is controlled by a computer terminal (shown in FIG. 1), and receives instructions to print a design of interest 6 onto the foamed froth 4 portion of the mug of latte 5 in a drop-on-demand manner.

Arm 11 acts to support printer head 140 and to move printer head laterally as shown by directional arrow N. Arm 10 allows longitudinal movement of the printer head 140 as shown by directional arrow M, Hardware and software necessary to control movement of the printer head are well known in the art.

Central support shaft 12 retains arms 10, 11 as well as tray 14 upon which beverage cup (e.g. mug of latte) is placed prior to printing. Optionally, the height of the tray may be adjusted prior to printing, to adjust for different sizes of beverage cups. In a coffee shop, several size mugs may be available, and tray arm 20 may be repositioned by moving it upwards or downwards within groove 22 of central support shaft 12.

Printed Circuit Board (PCB) 13 includes hardware and software necessary to control movement of the printer head, and includes input and output ports for communicating with external data devices (wired or wireless communication are embodied).

Figure 3:
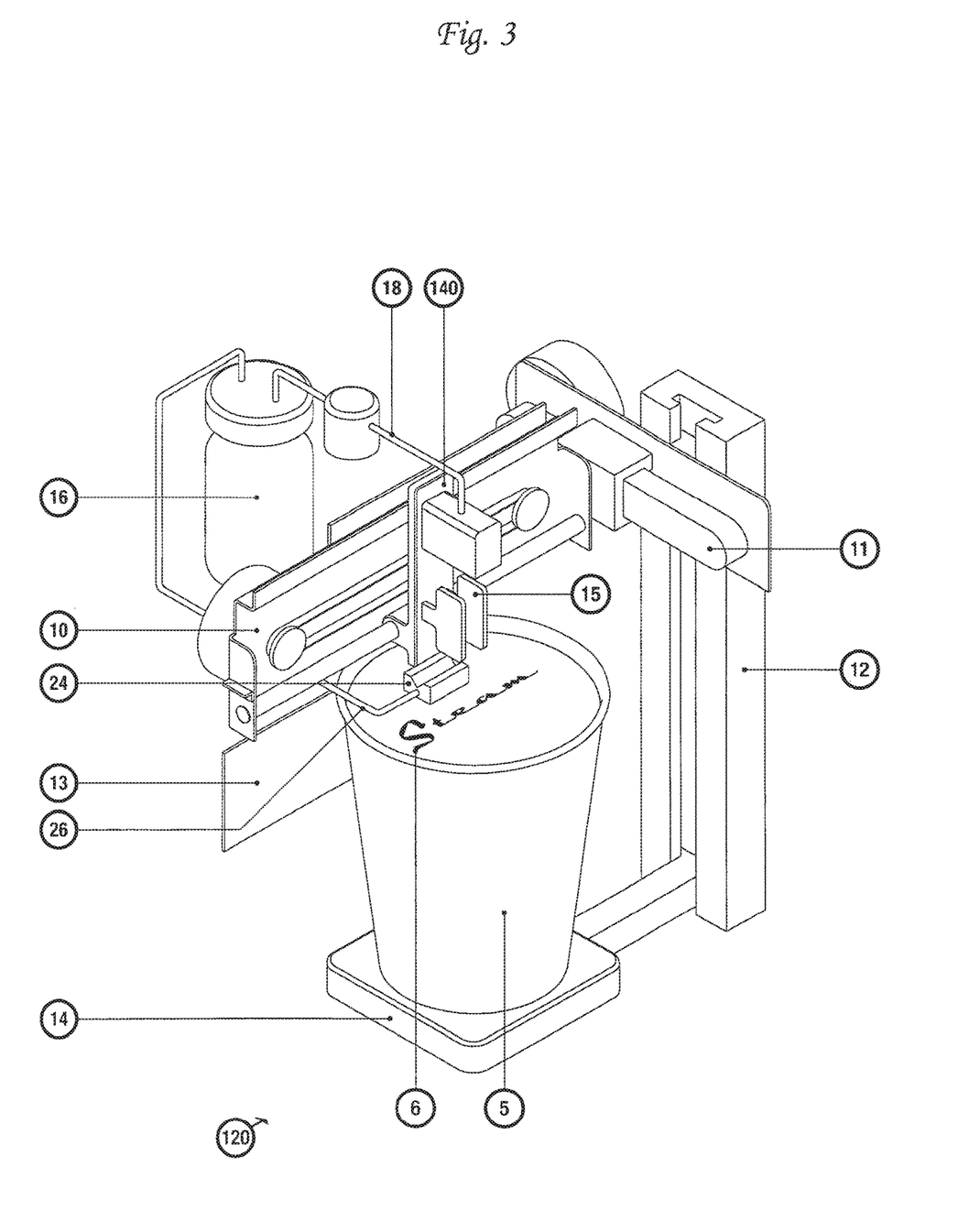
FIG. 3 is a perspective view of an inkjet printer which uses continuous jetting to aptly the design of interest to the beverage.

Referring to FIG. 3, an inkjet printer is illustrated, which prints using continuous jetting. Automated printer 120 includes a reservoir tank 16 in flowable communication with the printer head 140. Edible ink flows continuously from the reservoir tank 16 via tubing 18 towards high-voltage plates 15, and drops of ink are deflected by high voltage plates 15 in a pattern consistent with the design of interest 6. Non-utilized edible ink collects in trough 24 and is returned via tubing 26 to the reservoir tank 16.

In FIG. 3, large size mug 5 is illustrated, with tray arm 20 positioned at bottom of central support shaft 12. In contrast, in FIG. 2, tray arm 20 was shown approximately at the midpoint of central support shaft 12.

Figure 4A:
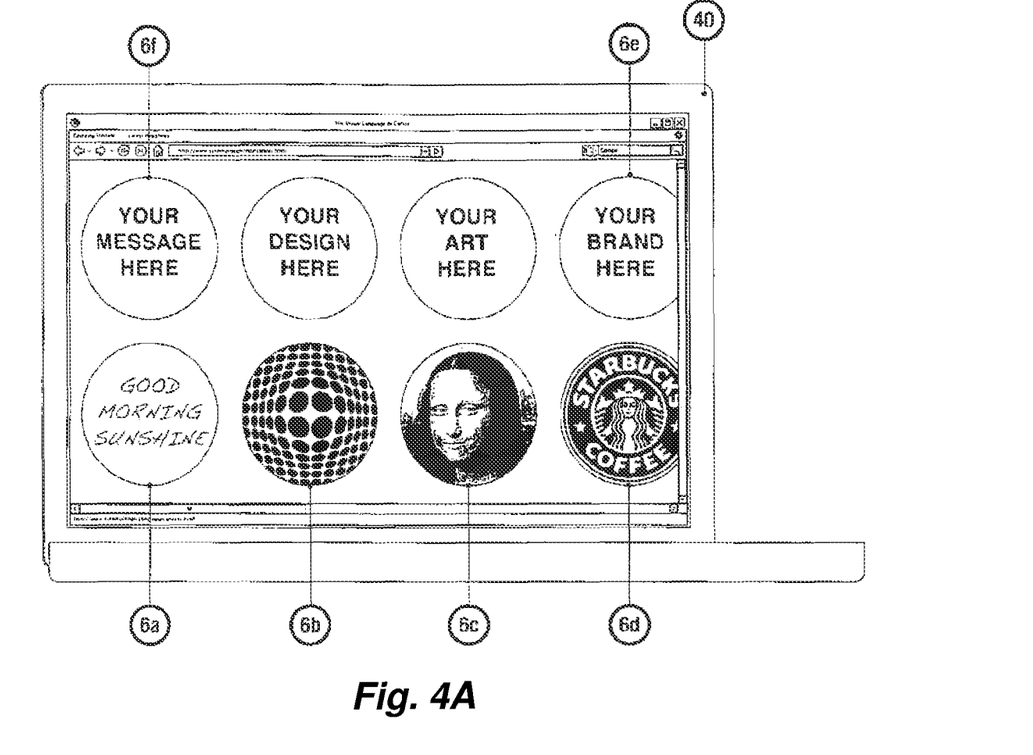

Referring to FIG. 4A, a various designs of interest 6a, 6b, 6c, 6d, may be selected from a menu displayed onscreen on a computer terminal 40 controlling the printer of the invention.

Optionally, advertisers may utilize the invention to print designs 6e, 6f promoting their products or company logo, and commercial use may be made of the invention as a method of doing business. Optionally, media content providers may utilize the invention to print licensed designs 6b, 6c as a method of doing business.

Personalized beverages displaying images of interest may be created and sold, for entertainment purposes or for marketing purposes. For instance, a consumer may wish to print a photographic-quality image of himself on his beverage. In another scenario, a beer manufacturer will pay a commission to have his logo printed on beers served at a specific well-known restaurant.

Figure 4B:
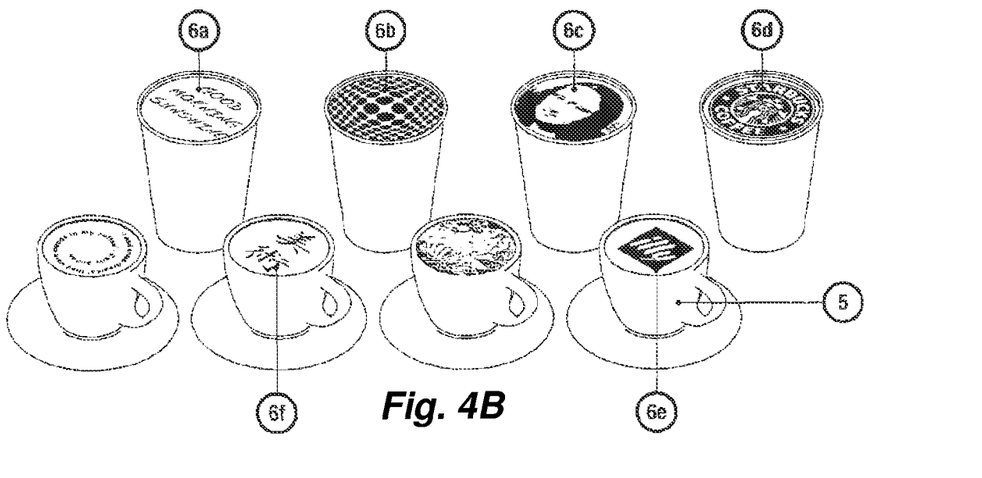
FIG. 4B illustrates the final printed products.

Referring to FIG. 4B, cups of beverages (both ceramic mugs and disposable takeout cups) are shown with the final printed designs of interest 6a-6f displayed upon the foamed portion of the beverage.

The ink is formulated so as to be suited for application upon a foam: an overly dense ink would sink immediately to the bottom of the beverage and would not form an image.

However, runny ink would bleed into the foam and would be useless in forming a design. The design may penetrate several millimeters into the foam, also known as "piercing the froth".

Obtaining a stable printed image upon a foam located over a liquid is novel and non-trivial. Adjusting the printing speed, ink droplet-size and additional parameters of the printing process, are all non-trivial and important for obtaining a clear image upon a foam typically situated above a liquid.

As the image is printed onto a foamed portion of a liquid beverage, the image is sensitive to movement. Care must be taken by the serving staff, to avoid rapid movement that could cause rippling of the liquid or dissolving of the foam, thus damaging the printed image.

Though the beverage described herein by way of example was coffee, the scope of the invention is not limited to this beverage. Rather, any beverage having a foamed portion may be printed upon. The foam or froth may be formed by agitating a beverage at high speed, such as is typical in a milk-based drink such as cappuccino, ice-cream shakes, fruit shakes, ice-based drinks (slurries) or the like. Alternatively, the foam may be inherent to the beverage such as in a carbonated beverage or a bubbly alcoholic beverage, where a foam layer is typically formed over the beverage during decanting of the beverage. Non-limiting examples of foamed beverages include hot or cold beverages selected from: coffee, milked-coffee, espresso, cappuccino, black coffee, grained coffee, ice-coffee, filtered coffee, cocoa products, coffee substitutes, products of cocoa substitutes, chocolate products, milk chocolate drink, an ice cream shake, a carbonated beverage, an alcoholic beverage, tea having a foamed-milk portion, and beer.

In certain embodiments, the colorant in the edible liquid ink comprises a beverage essence, which is a concentrated form of the beverage upon which the design is to be printed. In an example of such case, coffee essence may function as the edible ink, so that the coffee essence is loaded in the printer application head of the automated printer, and used to print upon the foam of a mug of cappuccino (or upon the foam portion of another type of coffee drink).

The processes and devices presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The term 'piercing' refers according to the present invention to either penetrating or etching of the foam of a beverage to at least a portion of its thickness. Namely, when the printing process is closely observed, the edible ink may be seen to delicately penetrate to a certain depth into the foamed layer.

Preferably, no synthetic dyes are present within the ink, as these are known to be carcinogenic.

The term 'beverages' refers to according to the present invention to any edible composition or matrix in a semi-solid, liquid or gel forms, cold or hot.

After printing, the image is visible such that a portion of the surface of the beverage is characterized by a certain color and/or a texture; the image differs noticeably from the aforementioned color and/or a texture of the remainder of the beverage surface.

The term 'coffee' and/or 'coffee cup' refers according to the present invention to any coffee and coffee-like foodstuff and beverages, selected in a non-limiting manner from coffee, milked-coffee, espresso, cappuccino, black-coffee, grained coffee, ice-coffee, filtered coffee, cocoa products, coffee substitutes, products of cocoa substitutes, chocolate products, milk chocolate drink, ice creams or any combination thereof.

The term 'froth' refers to according to the present invention to any foamed milk or cream, milk products, milk-substitutes or any colloidal or emulsified foodstuffs.

The term 'design' or 'image' refers to according to the present invention to any outlines selected in a non-limiting manner from any two dimensions or three dimensions, monochromatic, gray scaled or colored blueprint-like presentations, figures, ornamentations, decorations, patterns, logos, comics, figurative characters, freehand-like drawings, written texts, numbers, time indications or any combination thereof.

In one embodiment of the present invention, the printer used includes the following components: a movable printing head adapted to be maneuvered in a lateral or longitudinal movement; at least one reservoir tank containing a second edible beverage ink, in communication with said printing head; an (optionally movable) tray on which said container is located; and a controller (e.g., a computer, a computing unit etc) adapted to control the operation of said printing head in a predetermined manner; wherein a predetermined measure of said edible liquid ink or second beverage essence is passed throughout said printing head-such that said second beverages is applied upon a foamed portion of a beverage placed upon said tray. So that a design image of interest is printed upon the foamed portion of a beverage, It is acknowledged in this respect that said first beverage may be equal to the said second beverage ink. Additionally or alternatively, said first beverage may be different in one or more of its ingredients comparing the said second beverage.

More specific and according to yet another embodiment of the preset invention, an automated coffee printer is provided useful for designing the topical surface of coffee cup containing a froth by a means of a second coffee ink, During use of this automated coffee printer, the following components will be present: (a) a cup containing said first coffee; (b) a movable printing head adapted to be maneuvered in a lateral movement; (c) a reservoir tank containing said second coffee ink in communication with said printing head; (d) a movable tray on which said container is located, adapted to be maneuvered in a longitudinal movement; and (e) a controller (e.g., a computer or any processing unit) adapted, to control the operation of said printing head and said tray in a predetermined manner; wherein a predetermined measure of said second coffee is forced throughout said printing head, in the manner that said second coffee pierces the foam of said first coffee so that an image is obtained.

The edible ink may be ink jetted by drop on demand, and may be forced through the printing head by pressure or gravity means. Alternatively, the edible ink may be applied using continuous ink-jetting so as to flow between at least two piezoelectric plates adapted to direct its flow towards the surface of the first beverage in a controlled manner so the predetermined design of the said surface is obtained.

It is also in the scope of the present invention to provide a method for designing the surface of a foodstuff or beverages containing a foam portion by a means of the plurality of printing pins as defined above; said method comprising the step of enforcing said printing pins by means of the printing head simultaneously to the tray movement, in the manner that said printing pins are piercing said foam of said foodstuff or beverages hence the designing of the said surface is obtained.

More specifically, it is in the scope of the present invention to provide a method for designing the froth of a coffee cup by a means of the plurality of printing pins as defined above; said method comprising the step of enforcing said printing pins by means of the printing head simultaneously to the tray movement, in the manner that said printing pins are piercing said froth of said coffee cup hence the designing of the said froth is obtained. It is still in the scope of the present invention to provide the foodstuff or beverages having a designed surface, provided by means of the mechanical printer and the method as defined in any of the above. More specifically, it is in the scope of the present invention to provide a coffee cup having a designed froth, provided by the mechanical printing machine and method as defined above.

Lastly, it is another object of the present invention to provide a method of doing business, especially by presenting an efficient and cost effective method for advertising advertisements of the surface of foodstuffs and beverages comprising the step of either online or offline designing an advertisement by means of an automated printing it on the foamed surface of beverages.

The advantages of the method and printed beverage of the invention have been described, and may be utilized for entertainment purposes, for advertizing purposes or for other commercial purposes. Edible printing upon a foamed portion of a beverage has not been described in past, and the final product of such a printed beverage has not been marketed in past.

The invention claimed is:

1. A method of printing a design of interest, the method comprising:
   a. providing first beverage and second beverages, both of which are beers, the first beverage being disposed in a beverage cup and having a foamed upper surface, the second beverage being loaded into an automated ink-jet printer; and
   b. ink-jetting, from the automated ink-jet printer, droplets of the second beverage onto the first beverage so as to form the design of interest thereon.

2. The method of claim 1 wherein the droplets are deposited from a movable ink-jet printer head of the automated ink-jet printer.

3. The method of claim 2 wherein the movable ink-jet printer head move horizontally to form the design.

4. The method of claim 1 further comprising receiving a design specific signal and issuing control signals to the printer such that the printing head is actuated to apply the design to the foamed upper surface of the first beverage.

5. The method according to claim 1, further comprising the following steps, to be performed prior to said printing step: receiving digital data encrypting a design or receiving digital data encrypting a request for a design, via a telecommunications or media network, and instructing said printer to print said design upon said first beverage.

6. The method according to claim 1, wherein said design comprises at least one of: a two-dimensional image, a three-dimensional image, an outline, a gray-scaled image, a multi-colored image, a logo, a photographic-type image, written text, a pattern, a comic, or a drawing.

7. The printing method of claim 1 wherein (i) the method further comprises the steps of (A) before the printing, placing the beverage cup on a tray; and (B) adjusting the height of the tray and (ii) printing the design on the first beverage within the beverage cup resting on the height-adjusted tray.

8. A method of printing a design of interest, the method comprising:
   a. providing a target beverage in a beverage cup, the target beverage having a foamed upper surface;
   b. providing an edible ink loaded into an automated ink-jet printer; and
   c. ink-jetting, from the automated ink-jet printer, droplets of the edible ink onto the target beverage so as to form the design of interest thereon, wherein the target beverage is beer, and wherein the colorant of the edible ink is a concentrated form of beer.

9. The method of claim 8 wherein the droplets are deposited from a movable ink-jet printer head of the automated ink-jet printer.

10. The method of claim 9 wherein the movable ink-jet printer head moves horizontally to form the design.

11. The method of claim 8 further comprising receiving a design specific signal and issuing control signals to the printer such that the printing head is actuated to apply the design to the foamed upper surface of the target beverage.

12. The method according to claim 8, further comprising the following steps, to be performed prior to said printing step: receiving digital data encrypting a design or receiving digital data encrypting a request for a design, via a telecommunications or media network, and instructing said printer to print said design upon said target beverage.

13. The method according to claim 8, wherein said design comprises at least one of: a two-dimensional image, a three-dimensional image, an outline, a gray-scaled image, a multi-colored image, a logo, a photographic-type image, written text, a pattern, a comic, or a drawing.

14. The printing method of claim 8 wherein (i) the method further comprises the steps of (A) before the printing, placing the beverage cup on a tray; and (B) adjusting the height of the tray and (ii) printing the design on the target beverage within the beverage cup resting on the height-adjusted tray.

15. A method of printing a design of interest, the method comprising:
   a. providing first beverage and second beverage, the first beverage being a beer which is disposed in a beverage cup and which has a foamed upper surface, the second beverage being the same beer as the first beverage and being loaded into an automated ink-jet printer; and
   b. ink-jetting, from the automated ink-jet printer, droplets of the second beverage onto the first beverage so as to form the design of interest thereon, wherein the method is performed to provide at least one of the following features:
      i. the droplets are deposited from a movable ink-jet printer head of the automated ink-jet printer;
      ii. the beverage cup is disposed on a tray; and
      iii. the beverage remains stationary during printing.

16. The method of claim 15 wherein the droplets are deposited from a movable ink-jet printer head of the automated ink-jet printer.

17. The method of claim 15 wherein the beverage cup is disposed on a tray.

18. The method of claim 15 wherein the beverage remains stationary during printing.

* * * * *